US011930960B2

(12) United States Patent
Garcia (10) Patent No.: US 11,930,960 B2
(45) Date of Patent: Mar. 19, 2024

(54) COOKING APPARATUSES

(71) Applicant: Sensio Inc., New York, NY (US)

(72) Inventor: Jorge B. Garcia, Rogers, AR (US)

(73) Assignee: Sensio Inc., New York, NY (US)

( * ) Notice: Subject to any disclaimer, the term of this patent is extended or adjusted under 35 U.S.C. 154(b) by 0 days.

(21) Appl. No.: 17/225,050

(22) Filed: Apr. 7, 2021

(65) Prior Publication Data

US 2022/0313017 A1 Oct. 6, 2022

(30) Foreign Application Priority Data

Feb. 25, 2021 (CN) .......................... 202110211344.7
Feb. 25, 2021 (CN) .......................... 202120418769.0

(51) Int. Cl.
*A47J 37/06* (2006.01)
*F24C 7/08* (2006.01)
*F24C 15/32* (2006.01)

(52) U.S. Cl.
CPC ....... *A47J 37/0664* (2013.01); *A47J 37/0641* (2013.01); *F24C 7/085* (2013.01); *F24C 15/325* (2013.01)

(58) Field of Classification Search
CPC .......................... A47J 37/0641; A47J 37/0664
USPC ..................... 99/331, 324, 483; 219/388, 400
See application file for complete search history.

(56) References Cited

U.S. PATENT DOCUMENTS

| 4,333,188 A * | 6/1982 | Jensen | A47K 3/14 |
| | | | 4/514 |
| 4,577,773 A * | 3/1986 | Bitel | B25H 3/02 |
| | | | 206/561 |
| 5,603,559 A * | 2/1997 | Yemini | B25H 3/06 |
| | | | 312/334.44 |
| 11,045,046 B1 * | 6/2021 | Man | A47J 37/0641 |
| 2004/0040950 A1 * | 3/2004 | Carbone | F24C 15/325 |
| | | | 219/400 |
| 2009/0126580 A1 * | 5/2009 | Hartfelder | A47J 39/006 |
| | | | 99/483 |
| 2014/0238995 A1 * | 8/2014 | Vargas | B65D 25/08 |
| | | | 220/523 |
| 2016/0316969 A1 * | 11/2016 | White | A47J 27/13 |
| 2017/0231430 A1 | 8/2017 | Moon et al. | |

(Continued)

FOREIGN PATENT DOCUMENTS

| CA | 2837364 A1 | 6/2015 |
| CN | 110664270 A | 1/2020 |

(Continued)

OTHER PUBLICATIONS

International search report and written opinion issued in corresponding PCT application No. PCT/US2021/052791, dated Jan. 5, 2022 (18 pages).

(Continued)

*Primary Examiner* — Thien S Tran
(74) *Attorney, Agent, or Firm* — DLA Piper LLP (US)

(57) ABSTRACT

A cooking apparatus includes a housing defining an internal chamber. The internal chamber includes a cooking portion. The apparatus includes a single cooking container configured and adapted to be removably received in the cooking portion of the internal chamber. The single cooking container defines a cooking volume. The apparatus includes at least two heating elements positioned within the cooking portion of the internal chamber.

23 Claims, 6 Drawing Sheets

(56) References Cited

U.S. PATENT DOCUMENTS

| | | | |
|---|---|---|---|
| 2017/0245683 A1 | 8/2017 | Chen et al. | |
| 2018/0255971 A1 | 9/2018 | Moon et al. | |
| 2019/0282029 A1* | 9/2019 | Goldberg | A47J 36/32 |
| 2019/0374059 A1 | 12/2019 | Samonigg et al. | |
| 2020/0008616 A1 | 1/2020 | Moon | |
| 2021/0131673 A1* | 5/2021 | Barik | F24C 15/08 |

FOREIGN PATENT DOCUMENTS

| | | | |
|---|---|---|---|
| CN | 110693345 A | | 1/2020 |
| CN | 110859523 A | | 3/2020 |
| CN | 213309161 U | * | 6/2020 |
| CN | 211155317 U | | 8/2020 |
| CN | 211933708 U | | 11/2020 |
| CN | 211933709 U | | 11/2020 |
| CN | 211933710 U | | 11/2020 |
| CN | 212140218 U | | 12/2020 |
| CN | 212213510 U | | 12/2020 |
| CN | 112806866 A | | 5/2021 |
| KR | 20130143376 A | | 12/2013 |
| WO | 2018/095949 A1 | | 5/2018 |
| WO | 2021/011642 A1 | | 1/2021 |

OTHER PUBLICATIONS

International Preliminary Report on Patentability from corresponding PCT International Appln. No. PCT/US2021/052791 dated Sep. 7, 2023.

* cited by examiner

COOKING APPARATUSES

CROSS-REFERENCE TO RELATED APPLICATIONS

This application claims priority to Chinese Application No. 202110211344.7 and Chinese Utility Application No. 202120418769.0, both filed on Feb. 25, 2021 in the Chinese Patent Office. The entire contents of these applications are incorporated herein by reference in their entirety.

BACKGROUND

1. Field

The present disclosure relates to cooking apparatuses, and more particularly to air fryer cooking apparatuses.

2. Description of Related Art

An air fryer is a cooking apparatus that cooks foods by circulating hot air around the food within a basket positioned within a cooking chamber. In general, there is a fan operatively connected to a motor to circulate air around a heating element and also to circulate the hot air around the food, cooking the food and producing a crispy layer. The air fryer is able to fry foods using much less oil than a traditional fryer.

In some cases, it may be desirable to cook more than one type of food at one time. In this case, some air fryer cooking apparatuses allow a user to cook two separate food items simultaneously, even if they have different cooking times and temperatures. One example of this type of air fryer apparatus is shown in Chinese Publication No. CN110693345 published Jan. 17, 2020. Generally, these air fryer apparatuses use two separate baskets to cook the two separate food items. Under this configuration, the largest cooking volume is limited to the size of one of the baskets.

The conventional techniques have been considered satisfactory for their intended purpose. However, there is an ever present need for improved systems and methods for air fryer cooking apparatuses. This disclosure provides a solution for this need.

SUMMARY

A cooking apparatus includes a housing defining an internal chamber. The internal chamber includes a cooking portion. The apparatus includes a single cooking container configured and adapted to be removably received in the cooking portion of the internal chamber. The single cooking container defines a cooking volume. The apparatus includes at least two heating elements positioned within the cooking portion of the internal chamber.

In some embodiments, the cooking apparatus includes divider configured and adapted to be removably received in the single cooking container to divide the cooking volume into two separate cooking sections. The divider can be a solid barrier. The divider can include an insulating material. The internal chamber can include upper and lower walls that define the cooking portion of the internal chamber therebetween. The upper wall can include a dividing flange extending downward into the cooking portion of the internal chamber. When the divider is positioned within the single cooking container and when the single cooking container is positioned within the housing, the divider can be configured and adapted to mate with the dividing flange.

The cooking apparatus can include a first fan positioned between a top wall of the internal chamber and a first one of the heating elements, and a second fan positioned between the top wall of the internal chamber and a second one of the heating elements. The cooking apparatus can include a first motor operatively connected to the first fan and a second motor operatively connected to the second fan. Each motor can be configured to be independently controllable.

The internal chamber can have a top wall and a lower wall. The single cooking container can include a bottom surface more proximate to the lower wall of the internal chamber than the top wall of the internal chamber. The two heating elements can be positioned side-by-side between the upper wall of the internal chamber and the bottom surface of the single cooking container. The single cooking container can include a bottom surface defining a raised central rib. The raised central rib can be defined between two well portions of the bottom surface.

The cooking apparatus can include a first removable cooking tray and a second removable cooking tray. When in a cooking position, the first removable cooking tray can rest over a first of the two well portions and the second removable cooking tray can rest over a second of the two well portions. When in the cooking position, the first removable cooking tray and the second removable cooking tray can be positioned at a vertical position substantially even with a top surface of the raised central rib.

In accordance with another aspect, a cooking apparatus includes a housing defining an internal chamber. The internal chamber includes a cooking portion. The apparatus includes a cooking container configured and adapted to be removably received in the cooking portion of the internal chamber. The cooking container defines a cooking volume. The apparatus includes a solid divider configured and adapted to be removably received in the cooking container to divide the cooking volume into two separate cooking sections.

In some embodiments, the divider includes an insulating material. The internal chamber can include upper and lower walls that define the cooking portion of the internal chamber therebetween. The upper wall can include a dividing flange extending downward into the cooking portion of the internal chamber. When the divider is positioned within the cooking container and when the cooking container is positioned within the housing, the divider can be configured and adapted to mate with the dividing flange. The cooking apparatus can include at least two heating elements positioned within the cooking portion of the internal chamber. The cooking apparatus can include a first fan positioned between a top wall of the internal chamber and a first one of the heating elements, and a second fan positioned between a top wall of the internal chamber and a second one of the heating elements. The cooking apparatus can include a first motor operatively connected to the first fan and a second motor operatively connected to the second fan. Each motor can be configured to be independently controllable.

The internal chamber can have a top wall opposite from the lower wall. The single cooking container can include a bottom surface more proximate to the lower wall of the internal chamber than the top wall of the internal chamber. The two heating elements can be positioned side-by-side between the top wall of the internal chamber and the bottom surface of the cooking container. The cooking container can include a bottom surface defining a raised central rib. The raised central rib can be defined between two well portions of the bottom surface. The cooking apparatus can include a first removable cooking tray and a second removable cooking tray. When in a cooking position, the first removable cooking tray can rest over a first of the two well portions and the second removable cooking tray can rest over a second of the two well portions. The first removable cooking tray and the second removable cooking tray can be positioned at a vertical position substantially even with a top surface of the raised central rib.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
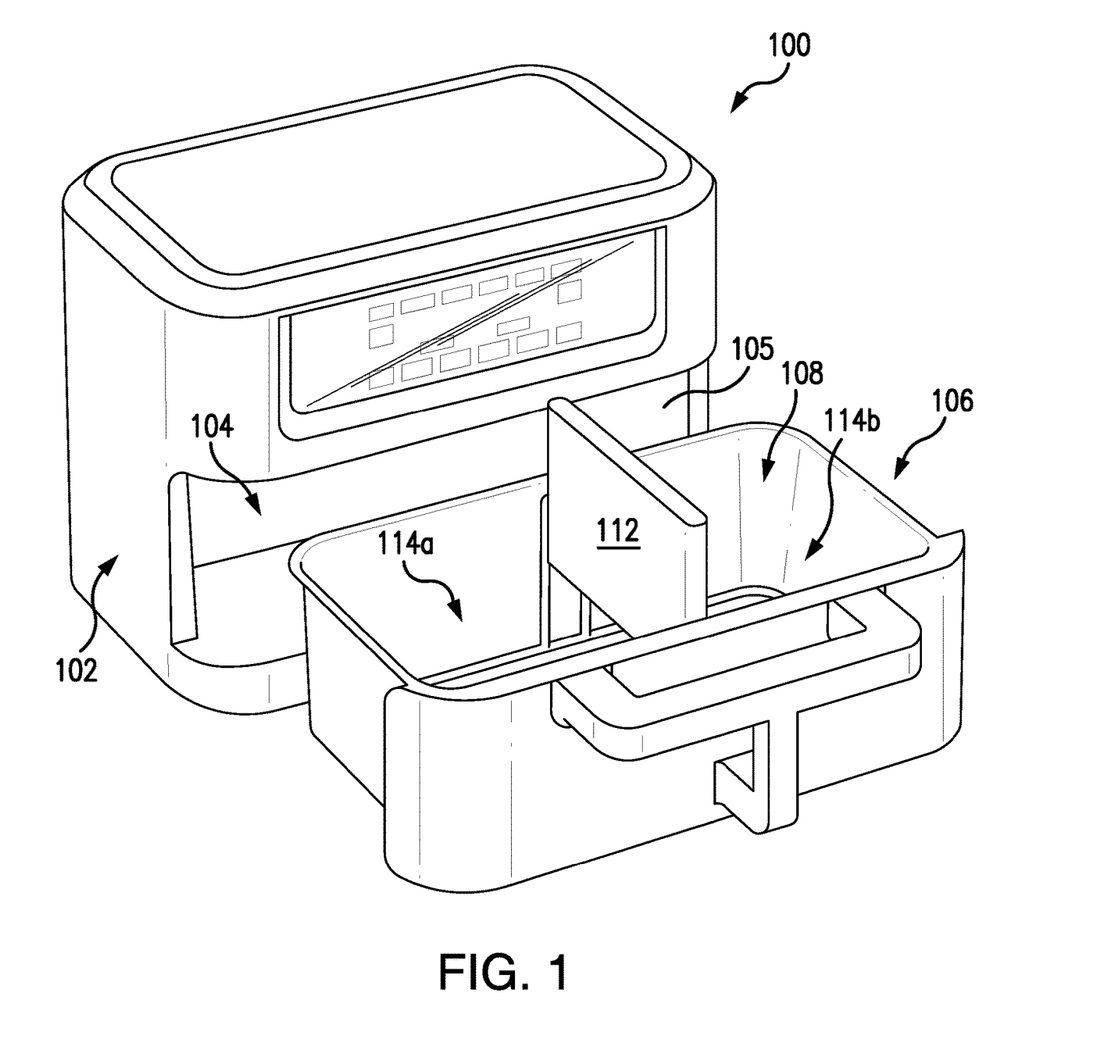
FIG. 1 is a schematic perspective view of an embodiment of a cooking apparatus constructed in accordance with the present disclosure, showing a housing defining an internal chamber and a single cooking container.

Reference will now be made to the drawings wherein like reference numerals identify similar structural features or aspects of the subject disclosure. For purposes of explanation and illustration, and not limitation, a schematic generalized depiction of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems described herein provide air fryer apparatuses with improved performance including the option for a large cooking volume which can be converted to two independent cooking zones when desired.

As shown in FIG. 1, a cooking apparatus 100 includes a housing 102 defining an internal chamber 104, and a single cooking container 106 configured and adapted to be removably received in a cooking portion 105 of the internal chamber 104. The single cooking container 106 defines a cooking volume 108. The cooking apparatus 100 includes divider 112 configured and adapted to be removably received in the single cooking container 106 to divide the cooking volume 108 into two separate cooking sections 114a and 114b. The divider 112 is a solid barrier and is constructed from an insulating material. The divider 112 does not have any vents or other permeability. This solid insulating divider 112 acts to avoid heat transfer from one cooking section 114a to the other 114b. In this way, when the divider 112 is in the cooking container 106, independent small batch cooking can be done, and when the divider 112 is removed, cooking container 106 provides single large cooking volume 108 that can cook larger food items.

Figure 2:
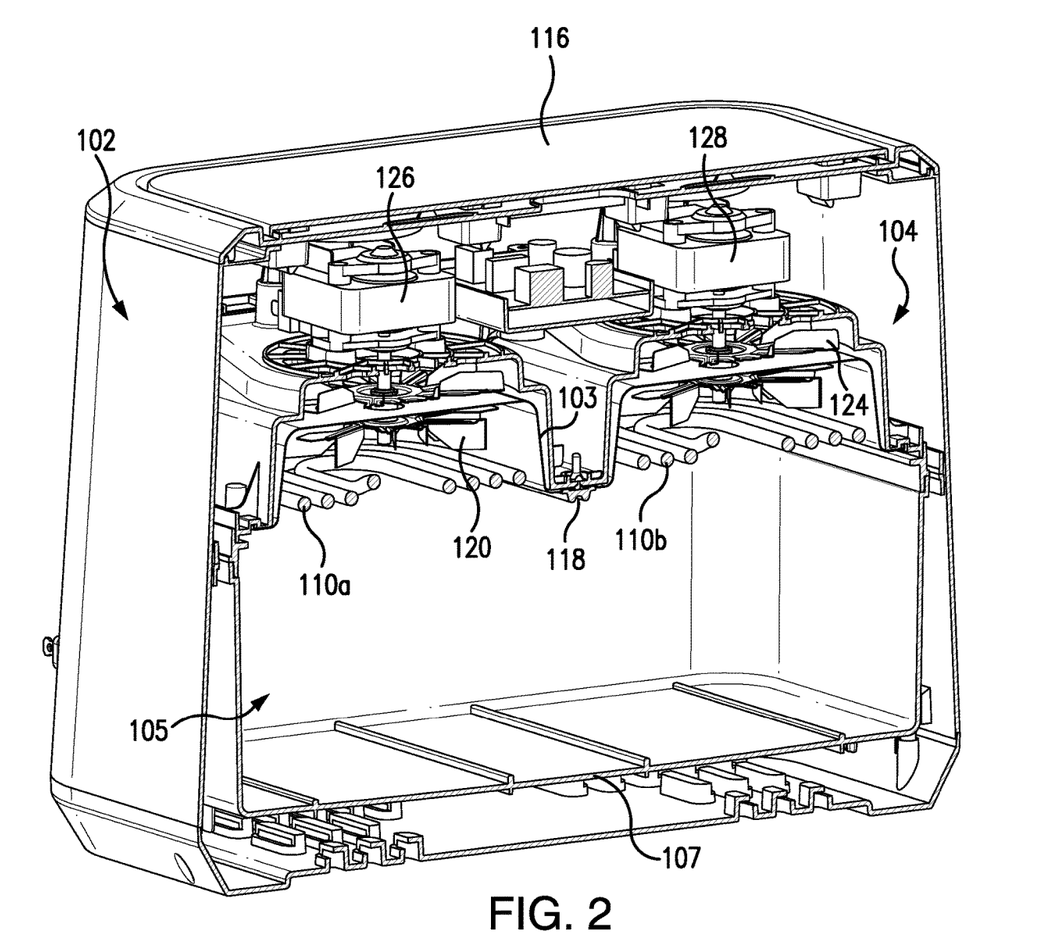
FIG. 2 is a detailed perspective cross-sectional view of the cooking apparatus of FIG. 1, showing the cooking apparatus with the single cooking container removed to show the internal chamber of the cooking apparatus.

With reference now to FIG. 2, the internal chamber 104 includes an upper wall 103 and a lower wall 107 that defines a cooking portion 105 of the internal chamber 104 between the upper and lower walls 103 and 107, respectively. The cooking apparatus 100 includes two heating elements 110a and 110b positioned within the cooking portion 105 of the internal chamber 104. The cooking apparatus 100 includes a first fan 120 positioned between the upper wall 103 of the internal chamber 104 and the first heating element 110a, and a second fan 124 positioned between the upper wall 103 of the internal chamber 104 and the second heating element 110b. The cooking apparatus 100 includes a first motor 126 operatively connected to the first fan 120 and a second motor 128 operatively connected to the second fan 124. Motors 126 and 128 are configured and adapted to drive rotation of their respective fans 120 and 124, thereby circulating air over heating elements 110a and 110b and throughout the cooking portion 105 of internal chamber 104.

Figure 3:
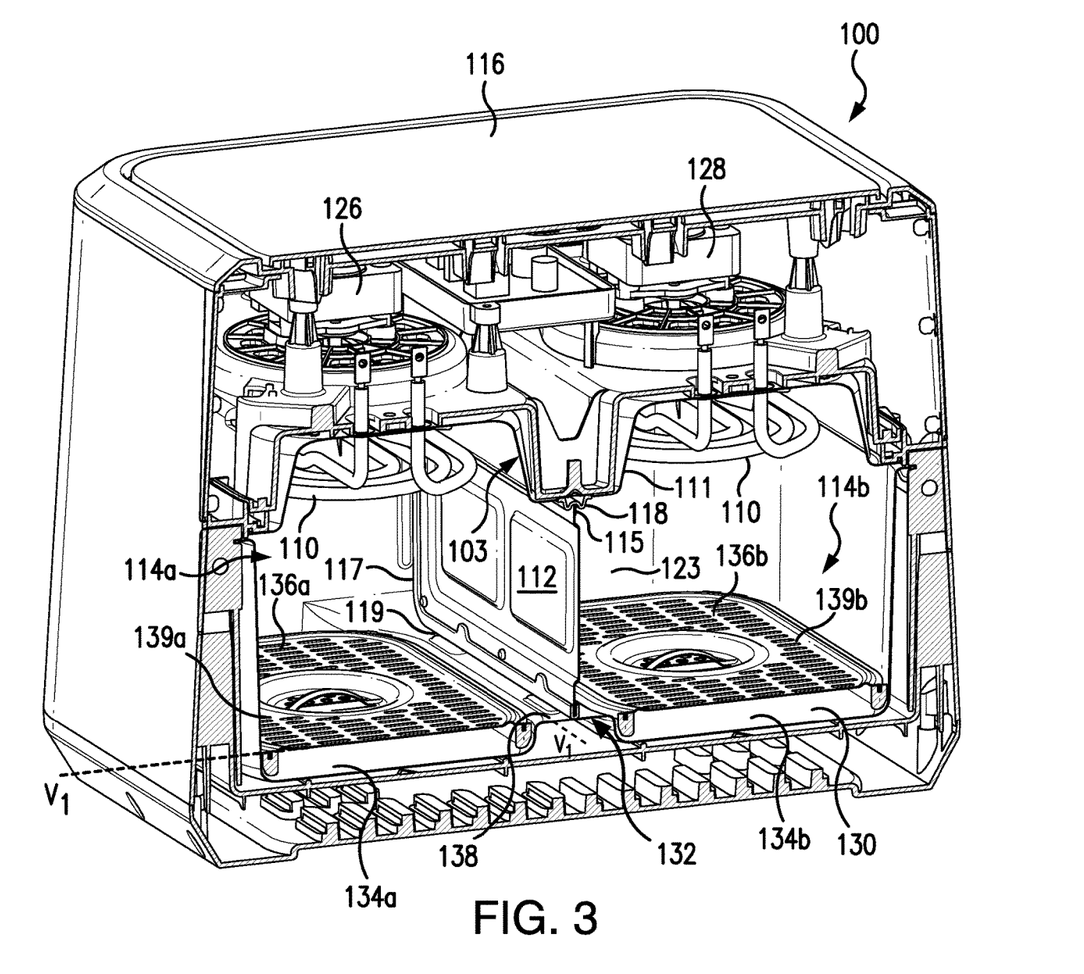
FIG. 3 is a detailed perspective cross-sectional view of the cooking apparatus of FIG. 1, showing the cooking apparatus with the single cooking container positioned within the cooking portion of the internal chamber.

As shown in FIGS. 2-3, the dual heating elements 110a and 110b, dual motors 126 and 128, and dual fans 120 and 124 allow for flexibility in cooking. The upper wall 103 includes a dividing flange 118 extending downward into the cooking portion 105 of the internal chamber 104. The upper wall 103 can have a protruding portion 111 that extends further into cooking portion 105 than other portions of upper wall 103. Dividing flange 118 can extend from the protruding portion 111 of upper wall 103 at the middle point of the internal chamber 104. One of the two heating elements 110a is on one side of the dividing flange 118 and the other of the heating elements 110b is on the other side of the dividing flange 118. The first fan 120 is on one side of the dividing flange 118 and the second fan 124 is on the other side of the dividing flange 118. When the divider 112 is positioned within the single cooking container 106 and when the single cooking container 106 is positioned within the housing 102, as shown in FIG. 3, the divider 112 is configured and adapted to mate with the dividing flange 118 to generate a seal between the divider 112 and the flange 118. Dividing flange 118 has a w-shaped cross-section and a top edge 115 of divider 112 nests within the center of the "w" to provide a better seal interface.

As shown in FIG. 3, the internal chamber 104 is defined between a top wall 116 and lower wall 107. When positioned within the internal chamber 104, single cooking container 106 has a bottom surface 130 more proximate to the lower wall 107 of the internal chamber 104 than the top wall 116 of the internal chamber 104. The two heating elements 110a and 110b are positioned side-by-side between the upper wall 103 of the internal chamber 104 and the bottom surface 130 of the single cooking container 106, when the cooking container 106 is within the internal chamber 104. The bottom surface 130 defines a raised central rib 132. The raised central rib 132 is defined between two well portions 134a and 134b of the bottom surface 130.

With continued reference to FIG. 3, those skilled in the art will readily appreciate that the flange 118 can be made from a heat-resistant elastic compressible material to provide a better seal with divider 112. Those skilled in the art will also readily appreciate that side and bottom edges 117 and 119, respectively, of the divider 112 can be made from a heat-resistant elastic compressible material to provide a better seal between divider 112 and raised central rib 132, back wall 123 and a front wall 125, shown in FIG. 5, of cooking container 106. The seal acts to segregate food and odor between the sections 114a and 114b. In this way, the two cooking sections 114a and 114b that are formed by the dividing flange 118 and divider 112 will be independent from each other and will allow for different foods to be cooked at different times and temperatures simultaneously. Each motor 126 and 128 is configured to be independently controllable so that air flow through each cooking section 114a and 114b can be independently controlled. For example, if only one cooking section 114a is desired to be in use, the motor 126 can be powered on, while the motor 128 operatively associated with cooking section 114b can be powered off.

Figure 4:
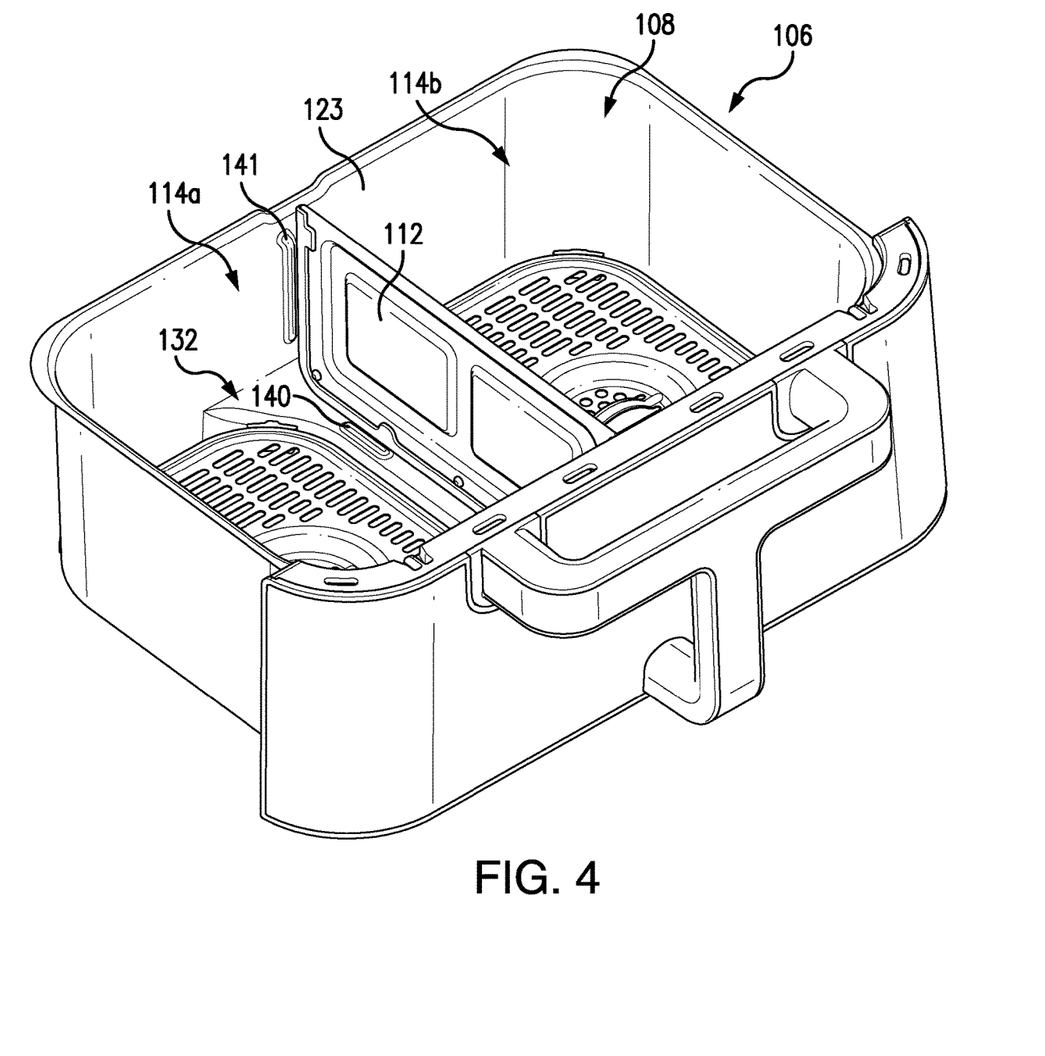
FIG. 4 is a detailed perspective view of the single cooking container of FIG. 1, showing the single cooking container having the divider positioned therein.

As shown in FIGS. 3-4, the cooking apparatus 100 can include a first removable cooking tray 136a and a second removable cooking tray 136b. When in a cooking position, the first removable cooking tray 136a rests over a first of the two well portions 134a and the second removable cooking tray 136b rests over a second of the two well portions 134a. By having two separate cooking trays 136a and 136b with central rib 132 therebetween, heat transfer between cooking sections 114a and 114b is further reduced or avoided. This facilitates the independent cooking capabilities when the divider 112 is in place. In contrast, if one cooking/crisper tray were used, heat transfer could occur from one side to the other when cooking with divider in and at different temperatures, reducing the independence between the chambers.

Figure 6:
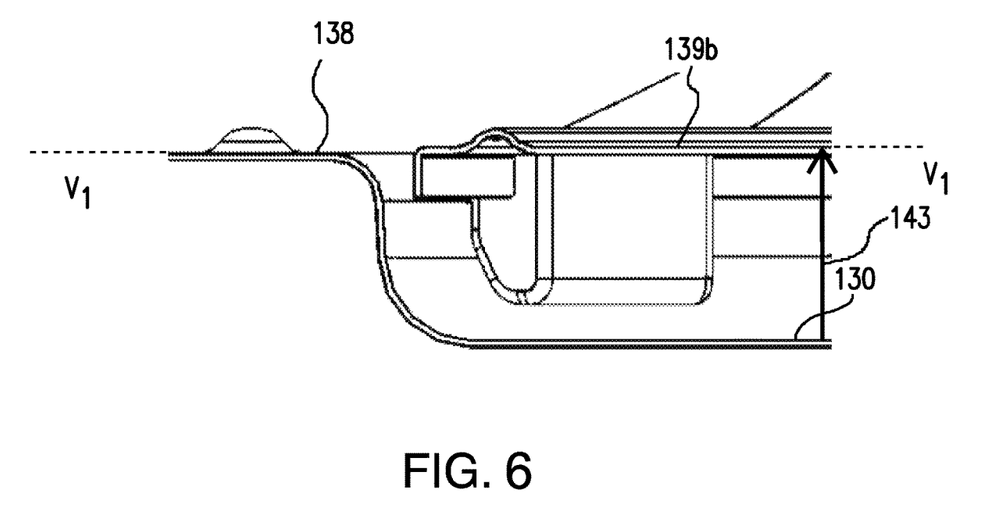
FIG. 6 is a schematic detailed cross-sectional view of a portion of the single cooking container of FIG. 1, showing one of the cooking trays positioned at a vertical position substantially even with a top surface of the raised central rib.

With continued reference to FIGS. 3 and 6, when in the cooking position, the first removable cooking tray 136a and the second removable cooking tray 136b have respective cooking surfaces 139a and 139b positioned at a vertical position $V_1$ substantially even with a top surface 138 of the raised central rib 132. Vertical position $V_1$ is upward in a perpendicular direction relative to bottom surface 130, as indicated schematically by arrow 143. By having the cooking trays 136a and 136b be positioned at a substantially even vertical elevation with the central rib 132, there will be a flat surface on the bottom of the single cooking container 106 when the divider 112 is not in place and two independent flat surfaces when the divider 112 is in place.

Figure 5:
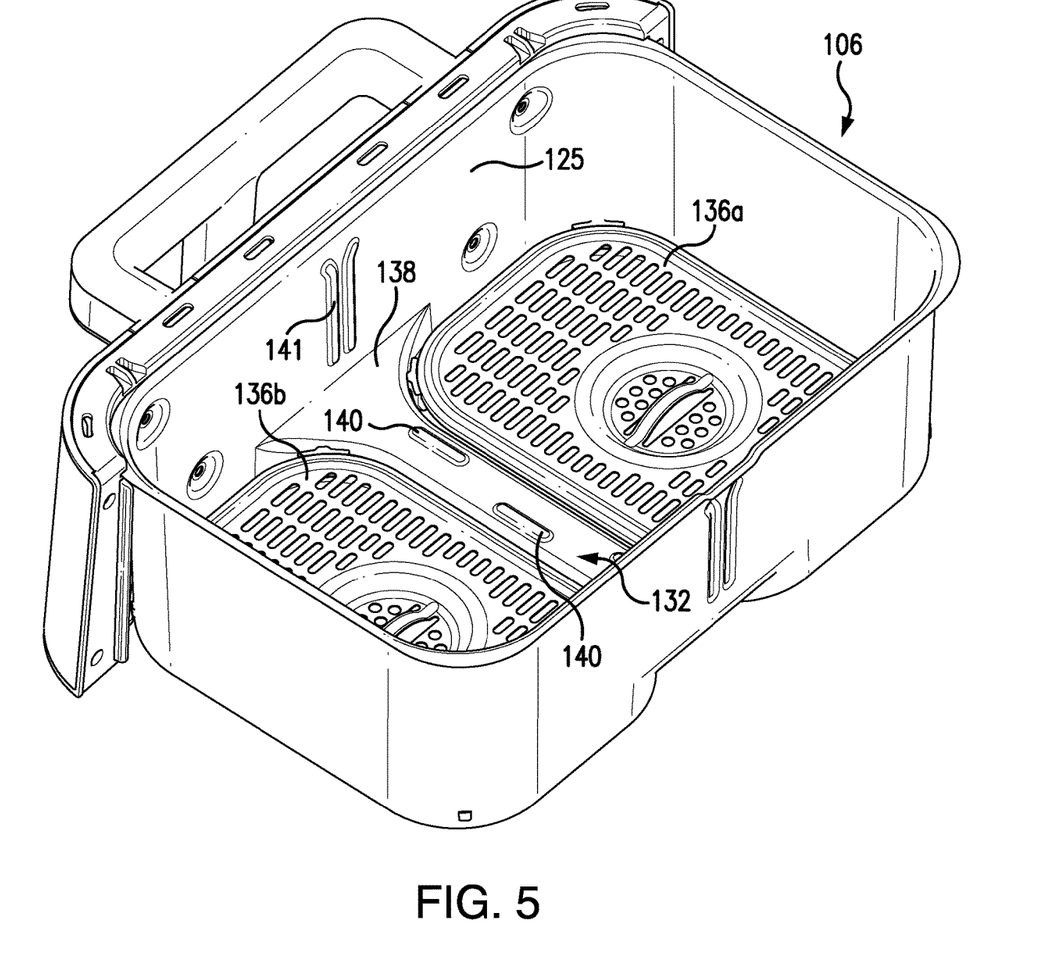
FIG. 5 is a detailed perspective view of the single cooking container of FIG. 1, showing the single cooking container having the divider removed.

With reference now to FIGS. 4 and 5, the top surface 138 of central rib 132 includes spaced apart protrusions 140. A back wall 123 and a front wall 125 include protrusions 141 that support both sides of the side edges 117 of the divider 112. The raised central rib 132 and the protrusions 140, along with the protrusions 141, hold the divider 112 in place when it is in the single cooking container 106. When the divider 112 is removed one large chamber is created allowing larger foods to be placed in the basket and air fryer. In the configuration of FIG. 5, where divider 112 is removed, the two heaters 110a and 110b and their associated fans 120 and 124 and motors 126 and 128, respectively, work together to maintain even temperatures in the cooking volume 108.

The methods and systems of the present disclosure, as described above and shown in the drawings, provide for improvements in air fryer apparatuses, such as the ability to have two independent batches of different types of food cooked simultaneously or a single large volume batch of food, thereby allowing for larger food items to be cooked in air fryer. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A cooking apparatus comprising:
a housing defining an internal chamber, wherein the internal chamber includes a cooking portion;
a single cooking container configured and adapted to be removably received in the cooking portion of the internal chamber, wherein the single cooking container includes a front wall, a back wall, and a bottom surface, wherein the single cooking container defines a cooking volume between the front wall, back wall, and the bottom surface;
at least two heating elements positioned within the cooking portion of the internal chamber; and
a divider configured and adapted to be removably received in the single cooking container to divide the cooking volume into two separate cooking sections, wherein the bottom surface and at least one of the front wall or the back wall includes a first set of spaced apart protrusions longitudinally aligned with one another and longitudinally separated from one another by longitudinal gaps along the bottom surface and at least one of the front wall or the back wall, and the bottom surface and at least one of the front wall or the back wall includes a second set of spaced apart protrusions longitudinally aligned with one another and longitudinally separated from one another by longitudinal gaps along the bottom surface and at least one of the front wall or the back wall,
wherein the first and second sets of spaced apart protrusions include bottom surface protrusions separate from the front wall and the back wall, the bottom surface protrusions are parallel to one another and longitudinally offset from one another along the bottom surface,
wherein the first and second sets of spaced apart protrusions are parallel to one another and are configured and adapted to hold the divider in place when it is in the single cooking container such that the first set of spaced apart protrusions are located on an opposite side of the divider than the second set of spaced apart protrusions.

2. The cooking apparatus of claim 1, wherein the divider is a solid barrier, the divider including an insulating material.

3. The cooking apparatus of claim 1, wherein the internal chamber includes upper and lower walls that define the cooking portion of the internal chamber therebetween, wherein the upper wall includes a dividing flange extending downward into the cooking portion of the internal chamber, wherein, when the divider is positioned within the single cooking container and when the single cooking container is positioned within the housing, the divider is configured and adapted to mate with the dividing flange.

4. The cooking apparatus of claim 1, further comprising a first fan positioned between a top wall of the internal chamber and a first one of the heating elements, and a second fan positioned between the top wall of the internal chamber and a second one of the heating elements.

5. The cooking apparatus of claim 4, further comprising a first motor operatively connected to the first fan and a second motor operatively connected to the second fan, wherein each motor is configured to be independently controllable.

6. The cooking apparatus of claim 1, wherein the internal chamber has a top wall and a lower wall, wherein the single cooking container includes a bottom surface more proximate to the lower wall of the internal chamber than the top wall of the internal chamber, wherein the two heating elements are positioned side-by-side between the upper wall of the internal chamber and the bottom surface of the single cooking container.

7. The cooking apparatus of claim 1, wherein the bottom surface defines a raised central rib, wherein the raised central rib is defined between two well portions of the bottom surface, wherein a portion of at least one of the first set or the second set of the spaced apart protrusions is formed on the raised central rib of the bottom surface.

8. The cooking apparatus of claim 7, further comprising a first removable cooking tray and a second removable cooking tray, wherein, when in a cooking position, the first removable cooking tray rests over a first of the two well portions and the second removable cooking tray rests over a second of the two well portions.

9. The cooking apparatus of claim 8, wherein, when in the cooking position, the first removable cooking tray and the second removable cooking tray are positioned at a vertical position substantially even with a top surface of the raised central rib.

10. A cooking apparatus comprising:
a housing defining an internal chamber, wherein the internal chamber includes a cooking portion;
a cooking container configured and adapted to be removably received in the cooking portion of the internal chamber, wherein the single cooking container includes a front wall, a back wall, and a bottom surface, wherein the cooking container defines a cooking volume between the front wall, back wall, and the bottom surface; and
a solid divider configured and adapted to be removably received in the cooking container to divide the cooking volume into two separate cooking sections, wherein the bottom surface and at least one of the front wall or the back wall includes a first set of spaced apart protrusions longitudinally aligned with one another and longitudinally separated from one another by longitudinal gaps along the bottom surface and at least one of the front wall or the back wall, and the bottom surface and at least one of the front wall or the back wall includes a second set of spaced apart protrusions longitudinally aligned with one another and longitudinally separated from one another by longitudinal gaps along the bottom surface and at least one of the front wall or the back wall,
wherein the first and second sets of spaced apart protrusions include bottom surface protrusions separate from the front wall and the back wall, the bottom surface protrusions are parallel to one another and longitudinally offset from one another along the bottom surface,
wherein the first and second sets of spaced apart protrusions are parallel to one another and are configured and adapted to hold the divider in place when it is in the single cooking container such that the first set of spaced apart protrusions are located on an opposite side of the divider than the second set of spaced apart protrusions.

11. The cooking apparatus of claim 10, wherein the divider includes an insulating material.

12. The cooking apparatus of claim 10, wherein the internal chamber includes upper and lower walls that define the cooking portion of the internal chamber therebetween, wherein the upper wall includes a dividing flange extending downward into the cooking portion of the internal chamber, wherein, when the divider is positioned within the cooking container and when the cooking container is positioned within the housing, the divider is configured and adapted to mate with the dividing flange.

13. The cooking apparatus of claim 10, wherein the internal chamber includes upper and lower walls that define the cooking portion of the internal chamber therebetween, the cooking apparatus further comprising at least two heating elements positioned within the cooking portion of the internal chamber.

14. The cooking apparatus of claim 13, further comprising a first fan positioned between a top wall of the internal chamber and a first one of the heating elements, and a second fan positioned between the top wall of the internal chamber and a second one of the heating elements.

15. The cooking apparatus of claim 14, further comprising a first motor operatively connected to the first fan and a second motor operatively connected to the second fan, wherein each motor is configured to be independently controllable.

16. The cooking apparatus of claim 13, wherein the internal chamber includes a top wall opposite from the lower wall, wherein the cooking container includes a bottom surface more proximate to the lower wall of the internal chamber than the top wall of the internal chamber, wherein the two heating elements are positioned side-by-side between the top wall of the internal chamber and the bottom surface of the cooking container.

17. The cooking apparatus of claim 10, wherein the bottom surface defines a raised central rib, wherein the raised central rib is defined between two well portions of the bottom surface, wherein a portion of at least one of the first set or the second set of the spaced apart protrusions is formed on the raised central rib of the bottom surface.

18. The cooking apparatus of claim 17, further comprising a first removable cooking tray and a second removable cooking tray, wherein when in a cooking position, the first removable cooking tray rest over a first of the two well portions and the second removable cooking tray rests over a second of the two well portions.

19. The cooking apparatus of claim 18, wherein the first removable cooking tray and the second removable cooking tray are positioned at a vertical position substantially even with a top surface of the raised central rib.

20. The cooking apparatus of claim 1, wherein side and bottom edges of the divider are made from a heat-resistant elastic compressible material to provide a thermal seal between the divider and at least one of the back wall, the front wall, or a raised central rib of the bottom surface.

21. The cooking apparatus of claim 10, wherein side and bottom edges of the divider are made from a heat-resistant elastic compressible material to provide a thermal seal between the divider and at least one of the back wall, the front wall, or a raised central rib of the bottom surface.

22. A cooking apparatus comprising:
a housing defining an internal chamber, wherein the internal chamber includes a cooking portion;
a single cooking container configured and adapted to be removably received in the cooking portion of the internal chamber, wherein the single cooking container defines a cooking volume, wherein the single cooking container includes a bottom surface defining a raised central rib, wherein the raised central rib is defined between two well portions of the bottom surface;
a divider configured and adapted to be removably received in the cooking container to divide the cooking volume into two separate cooking sections; and
a first removable cooking tray and a second removable cooking tray, wherein, when in a cooking position, the first removable cooking tray rests over a first of the two well portions and the second removable cooking tray rests over a second of the two well portions, and wherein top cooking surfaces of the first removable cooking tray and the second removable cooking tray are positioned at a vertical position substantially even with a top surface of the raised central rib.

23. The cooking apparatus of claim 1, further comprising:
a first fan positioned between a top wall of the internal chamber and a first one of the heating elements, and a second fan positioned between the top wall of the internal chamber and a second one of the heating elements,
wherein the internal chamber includes upper and lower walls that define the cooking portion of the internal chamber therebetween,
wherein the upper wall includes a dividing flange extending downward into the cooking portion of the internal chamber below the first one of the heating elements and the second one of the heating elements, the dividing flange separating the first one of the heating elements from the second one of the heating elements, and
wherein, when the divider is positioned within the single cooking container and when the single cooking container is positioned within the housing, the divider is configured and adapted to mate with the dividing flange.

\* \* \* \* \*